US009587782B2

(12) United States Patent
Johnson et al.

(10) Patent No.: US 9,587,782 B2
(45) Date of Patent: Mar. 7, 2017

(54) DISPLAY DEVICE HOLDER

(71) Applicant: Rosemount Aerospace Inc., Burnsville, MN (US)

(72) Inventors: Wallace Johnson, Prior Lake, MN (US); Kenneth Freeman, Eagan, MN (US); Jeffrey P. Danicich, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 254 days.

(21) Appl. No.: 14/248,000

(22) Filed: Apr. 8, 2014

(65) Prior Publication Data

US 2015/0285432 A1    Oct. 8, 2015

(51) Int. Cl.
| | |
|---|---|
| A47B 91/00 | (2006.01) |
| F16M 13/02 | (2006.01) |
| B64D 47/00 | (2006.01) |
| B60R 11/02 | (2006.01) |
| F16M 11/04 | (2006.01) |

(Continued)

(52) U.S. Cl.
CPC ....... F16M 13/022 (2013.01); B60R 11/0235 (2013.01); B64D 47/00 (2013.01); F16M 11/041 (2013.01); F16M 11/08 (2013.01); F16M 11/105 (2013.01); F16M 11/16 (2013.01); F16M 13/00 (2013.01);
(Continued)

(58) Field of Classification Search
CPC .......................... F16M 13/022; B60R 11/0235
USPC ........ 248/154, 176.1, 289.11, 299.1, 346.03, 248/346.06, 346.07, 917, 918, 552; 200/331; 206/320; 312/223.1; 70/58, 70/232, DIG. 57
See application file for complete search history.

(56) References Cited

U.S. PATENT DOCUMENTS 2,720,372 A    10/1955  Gowan
3,333,911 A *  8/1967  Errichiello ........... H05K 5/0204
                                                  248/552
(Continued)

FOREIGN PATENT DOCUMENTS

| DE | 202014007665 U1 * | 12/2014 | ............. B60R 11/02 |
|---|---|---|---|
| EP | 2661058 A1 | 11/2013 | |
| WO | 2013020234 A1 | 2/2013 | |

OTHER PUBLICATIONS

Extended European Search Report dated Jan. 28, 2016, for corresponding European Application No. 15162856.7.

(Continued)

Primary Examiner — Gwendolyn Baxter
(74) Attorney, Agent, or Firm — Kinney & Lange, P.A.

(57) ABSTRACT

In one example, an apparatus for holding a display device includes a back plate and a plurality of engaging members disposed around a periphery of the back plate. The back plate includes a rear face and a front face opposite the rear face. The plurality of engaging members extend from the back plate in a direction from the rear face to the front face to define an outer boundary of a retention space configured to accept the display device. The plurality of engaging members includes a rotatable engaging member configured to rotate between an engagement position and a disengagement position. The engagement position is configured to secure the display device within the retention space. The disengagement position is configured to allow removal of the display device from the retention space.

17 Claims, 6 Drawing Sheets

(51) Int. Cl.
*F16M 11/08* (2006.01)
*F16M 11/10* (2006.01)
*F16M 11/16* (2006.01)
*F16M 13/00* (2006.01)
*B60R 11/00* (2006.01)

(52) U.S. Cl.
CPC  *B60R 2011/0085* (2013.01); *F16M 2200/021* (2013.01)

(56) References Cited

U.S. PATENT DOCUMENTS

| | | | | |
|---|---|---|---|---|
| 4,085,369 | A * | 4/1978 | Burke | B60R 11/0205 224/42.25 |
| 5,480,115 | A | 1/1996 | Haltof | |
| 2011/0024587 | A1 | 2/2011 | Tsai | |
| 2012/0075789 | A1* | 3/2012 | DeCamp | F16M 11/041 361/679.26 |
| 2012/0193496 | A1* | 8/2012 | Li | F16M 11/041 248/316.1 |
| 2013/0043369 | A1* | 2/2013 | Wheeler | A47F 7/024 248/551 |
| 2013/0148273 | A1 | 6/2013 | Tsai | |
| 2014/0124644 | A1* | 5/2014 | Wong | E05B 73/0082 248/553 |
| 2015/0108317 | A1* | 4/2015 | Cruz | B62B 9/26 248/479 |
| 2015/0336495 | A1* | 11/2015 | Maslakow | B60N 3/00 224/401 |

OTHER PUBLICATIONS

The European Partial Search Report mailed Sep. 24, 2015 for European Application No. 15162856.7.

\* cited by examiner

DISPLAY DEVICE HOLDER

BACKGROUND

The present disclosure relates to electronic device holders, and in particular to electronic device holders that can be mounted to a vehicle, such as an aircraft.

Electronic devices, such as laptop computers, tablet computers, and the like, can be used to interact with programs and/or data stored on the device or accessed via a network, such as a local area network (LAN) or wide area network (e.g., the Internet). Such devices are becoming increasingly portable through increasing processing power as well as decreasing size and weight. These devices often include a touch-sensitive display integrated with the device. The touch-sensitive display both outputs visual data at the display and receives user input in the form of gestures (e.g., tap gestures, sliding gestures, pinch gestures, or other gestures). The dual use of touch-sensitive displays (i.e., displaying visual data and receiving input commands) can help to further decrease the size, weight, and usability of the devices by decreasing the need for additional input and/or output components (e.g., a keyboard, mouse, external display, etc.)

The increased portability of electronic devices, such as tablet computers, has led to a more widespread and varied use of the devices. In turn, the widespread use has led to the development of a variety of mounting structures and device holders. For instance, various mounting structures have been developed to mount electronic devices on a desk, within vehicles such as cars, or to other structures and/or areas. However, in many cases, such mounting structures and/or holders are formed of plastic or other materials that engage the device via an interference fit (e.g., a snap-in fit). Such materials and designs may not be adapted to withstand environments in which the mounting structure is subjected to frequent use and/or vibrational loads, thereby decreasing usability of the mounting structure in fields such as avionics. Moreover, typical mounting structures may not be adaptable to be mounted in a variety of applications, such as between different types and/or variations of vehicles.

SUMMARY

In one example, an apparatus for holding a display device includes a back plate and a plurality of engaging members disposed around a periphery of the back plate. The back plate includes a rear face and a front face opposite the rear face. The plurality of engaging members extend from the back plate in a direction from the rear face to the front face to define an outer boundary of a retention space configured to accept the display device. The plurality of engaging members includes a rotatable engaging member configured to rotate between an engagement position and a disengagement position. The engagement position is configured to secure the display device within the retention space. The disengagement position is configured to allow removal of the display device from the retention space.

In another example, an apparatus for holding a display device includes a back plate, a plurality of engaging members disposed around a periphery of the back plate, and a mounting flange. The back plate includes a rear face and a front face opposite the rear face. The plurality of engaging members extend from the back plate in a direction from the rear face to the front face to define an outer boundary of a retention space configured to accept the display device. The mounting flange is connected to the rear face of the back plate via a plurality of fasteners. The back plate includes a first plurality of apertures arranged in a first pattern. The mounting flange includes a second plurality of apertures arranged in a second pattern. The second pattern is complementary to the first pattern to allow insertion of the plurality of fasteners through the first plurality of apertures into the second plurality of apertures. The first pattern of apertures in the back plate is arranged to allow connection of the mounting flange via both a first set of the first plurality of apertures and a second, different set of the first plurality of apertures.

DETAILED DESCRIPTION

According to techniques of this disclosure, an apparatus for holding a display device (e.g., a tablet computer), can be configured to be connected to a mounting structure, such as a mounting structure within a cockpit of an aircraft. The device holder includes a back plate and a plurality of engaging members disposed around a periphery of the plate to secure the display device within the device holder. The device holder can be formed of metal or other durable material to secure the display device and withstand vibrational loads and/or repeated use that can result from a commercial setting. In certain examples, the device holder can be formed of a lightweight material (e.g., aluminum), thereby increasing usability for weight-sensitive applications, such as in the field of avionics. As described herein, at least one of the plurality of engaging members can be rotatable between an engagement position that prevents removal of the display device from the holder and a disengagement position that allows removal of the display device. In some examples, a locking mechanism can prevent rotation of the rotatable engaging member (e.g., a locking mechanism adapted to receive a removable lock, such as a luggage lock), thereby preventing removal of the display device. In certain examples, a mounting flange that connects to a mounting structure (e.g., in a cockpit of an aircraft) can have a rotatable portion, thereby enabling rotation of the display device, such as between landscape and portrait orientations. The device holder and mounting flange can connect in a plurality of configurations, thereby enabling adaptable mounting of the device holder to the mounting structure.

Figure 1:
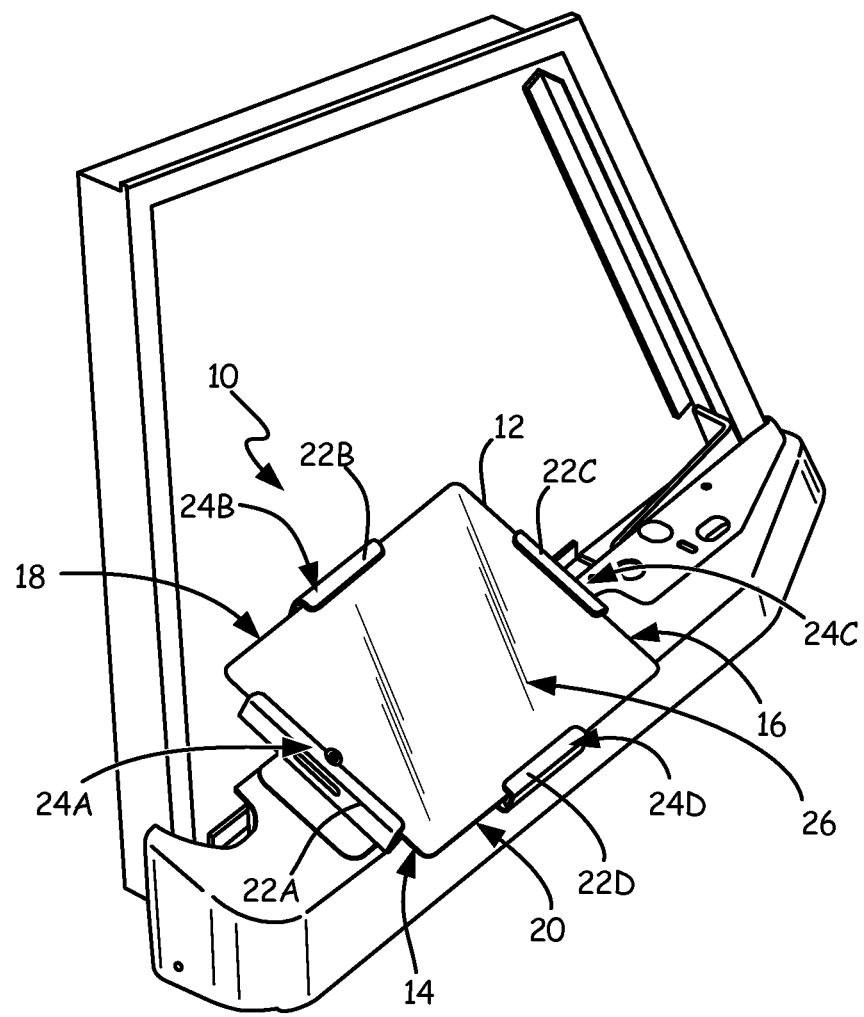
FIG. 1 is a perspective view of a device holder including a display device mounted in a cockpit of an aircraft.

FIG. 1 is a perspective view of device holder 10 that mounts display device 12 within the cockpit of an aircraft. While illustrated and described with respect to the aerospace industry, it should be understood that techniques of this disclosure may be applicable to other industries and/or applications.

As illustrated in FIG. 1, device holder 10 includes first end 14, second end 16, first side 18, and second side 20. Device holder 10 further includes engaging members 22A-22D disposed around a periphery of device holder 10 to secure display device 12 within display holder 10. Each of engaging members 22A-22D respectively includes one of retaining portions 24A-24D. Display device 12 includes display portion 26.

Engaging member 22A is disposed at first end 14, engaging member 22B is disposed at first side 18, engaging member 22C is disposed at second end 16, and engaging member 22D is disposed at second side 20. First end 14 is opposite second end 16. First side 18 is opposite second side 20. Both first end 14 and second end 16 are orthogonal to both first side 18 and second side 20. However, while device holder 10 is illustrated in the example of FIG. 1 as configured to receive and retain generally rectangular display device 12, aspects of this disclosure are not so limited. For instance, in other examples, device holder 10 can be configured to receive and retain a non-rectangular display device, thereby possibly including differing numbers and arrangements of ends and/or sides.

Retaining portions 24A-24D of engaging members 22A-22D are configured to extend from the periphery of device holder 10 in a direction toward an interior of device holder 10 to secure display device 12 within device holder 10. Retaining portions 24A-24D overlap a display side of display device 12 by a distance that secures display device 12 within display holder 10 while maintaining an open viewing area by which to view and/or interact with display portion 26. In some examples, one or more of engaging members 22A-22D may not include a corresponding one of retaining portions 24A-24D. For instance, one or more of engaging members 22A-22D may be a generally L-shaped engaging member that engages display device 12 at a side of display device 12, but does not include a corresponding one of retaining portions 24A-24D that extends toward an interior of device holder 10.

Display device 12, illustrated in FIG. 1 as a tablet computer, can be any device capable of displaying visual information to a user. For instance, in some examples, display device 12 can be a display screen operatively coupled to a computing device to display visual content delivered by the computing device to the display screen. In other examples, such as the example of FIG. 1, display device 12 can be a computing device having an integrated display (e.g., a touch-sensitive display). Examples of such computing devices can include, but are not limited to, portable or mobile computing devices such as mobile phones (including smartphones), laptop computers, tablet computers, personal digital assistants (PDAs), or other computing devices.

In the example of FIG. 1, each of engaging members 22A-22D are positioned in an engagement position configured to secure display device 12 within device holder 10 to prevent removal of display device 12 from device holder 10. At least one of engaging members 22A-22D can be a rotatable engaging member that is rotatable between the engagement position and a disengagement position that allows removal of display device 12 from device holder 10, as is further described below. For instance, in the example of FIG. 1, engaging member 22A can be a rotatable engaging member that allows removal and insertion of display device 12 along first end 14, and engaging members 22B-22D can be fixed engaging members that are not movable with respect to device holder 10. However, in other examples, more than one of engaging members 22A-22D can be a rotatable member, thereby allowing removal of display device 12 from device holder 10 along more than one of first end 14, second end 16, first side 18, and second side 20.

In the example of FIG. 1, device holder 10 includes four engaging members 22A-22D arranged around the periphery of device holder 10. However, in other examples, device holder 10 can include different numbers of engaging members, such as two, three, five, or more engaging members. In general, device holder 10 can include any number of engaging members that is sufficient to prevent removal and/or insertion of display device 12 when each of the engaging members is in the engagement position.

Figure 2:
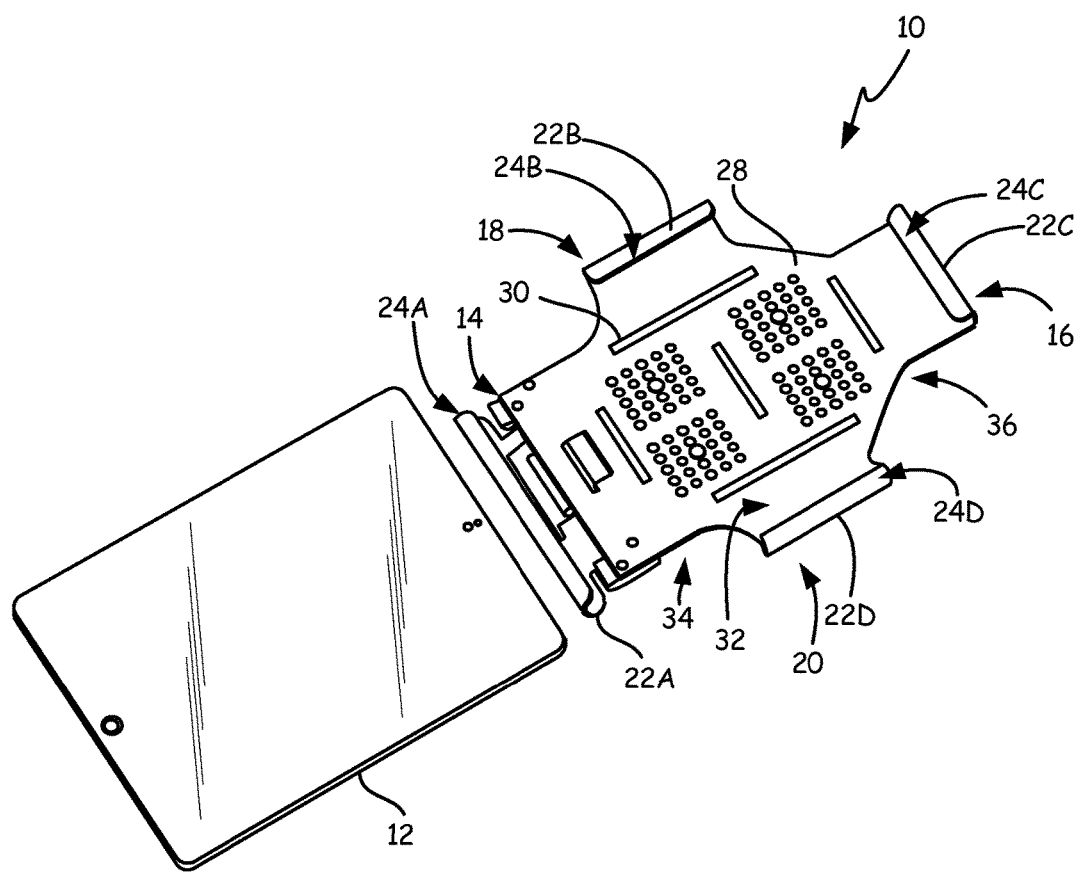
FIG. 2 is a perspective view of the device holder with a rotatable engaging member in a disengagement position and the display device removed.

FIG. 2 is a perspective view of device holder 10 with rotatable engaging member 22A in a disengagement position and display device 12 removed. As illustrated in FIG. 2, device holder 10 further includes back plate 28 and filler elements 30. Back plate 28 includes front face 32 and rear face 34, opposite front face 32. Engaging members 22A-22D are disposed around a periphery of back plate 28 and extend from back plate 28 in a direction from rear face 34 to front face 32. As such, engaging members 22A-22D define an outer boundary of retention space 36 that is configured to accept display device 12. As illustrated, engaging members 22B-22D (i.e., fixed engaging members in this example) are in the engagement position and prevent removal of display device 12 from retention space 36 in an axis of back plate 28 along second end 16, first side 18, and second side 20. In addition, retaining portions 24B-24D are configured to wrap around and overlap a display side of display device 12 to prevent removal of display device 12 from retention space 36 in a direction from rear face 34 to front face 32. As illustrated, rotatable engaging member 22A, positioned in the disengagement position, allows display device 12 to be removed and/or inserted in an axis of back plate 28 along first end 14. For instance, display device 12 can be slid into or out of retention space 36 along first end 14 when rotatable engaging member 22A is rotated to the disengagement position.

In some examples, back plate 28 and engaging members 22A-22D can be formed from a rigid material, such as metal (e.g., aluminum), composites, or other such materials. Filler elements 30 can be formed of foam or other compressible material, and can be positioned at one or more locations of back plate 28. In addition, filler elements 30 can be positioned within one or more of engaging members 22A-22D, such as at an under side of one or more of retaining portions 24A-24D (not illustrated). Filler elements 30 can be secured to back plate 28 and/or engaging members 22A-22D via adhesive or other attachment mechanism to prevent filler elements 30 from disengaging during operation, such as when display device 12 is inserted and/or removed from device holder 10.

Filler elements 30 are configured to extend from back plate 28 in a direction from rear face 34 to front face 32 by a distance configured to secure display device 12 between back plate 28 and engaging members 22A-22D (and/or a filler element disposed at an under side of retaining portions 24A-24D). In this way, filler elements 30 can secure display device 12 within retention space 36 to help prevent movement of display device 12 within retention space 36, such as during operation in an aircraft cockpit. In certain examples, filler elements 30 can extend from back plate 28 by a distance configured to prevent contact between display device 12 and fasteners that mount back plate 28 to a mounting structure (e.g., bolt heads, bolt shafts, rivets, or other fasteners), as is further described below.

Figure 3:
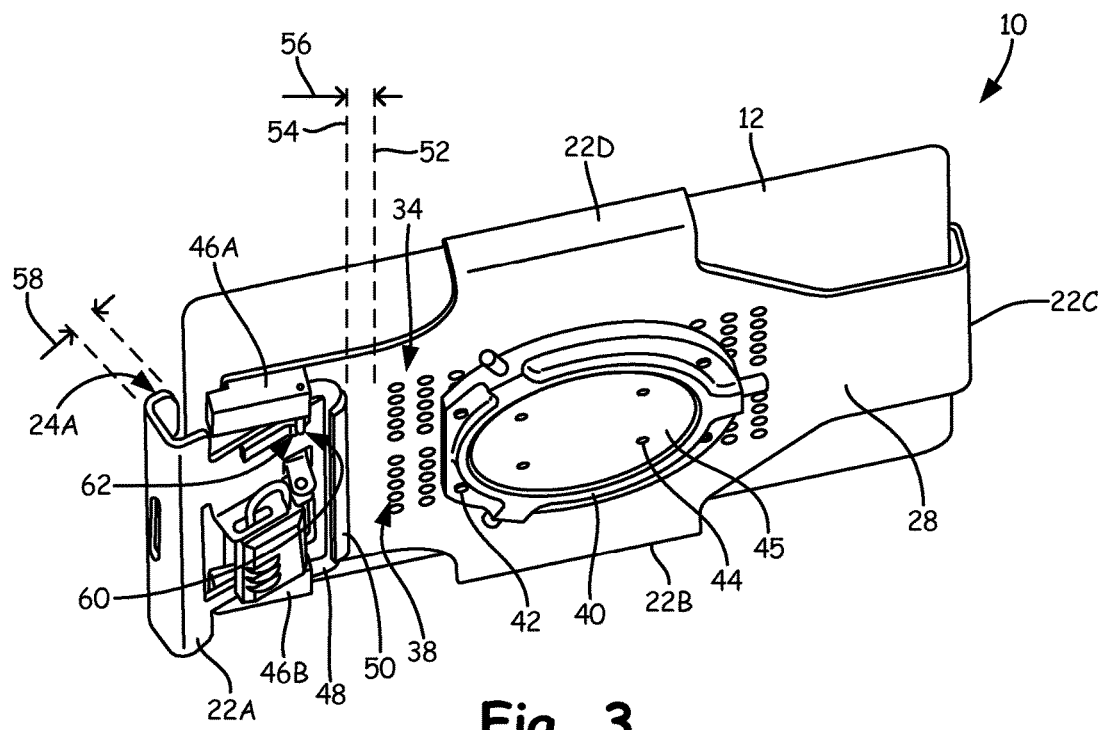
FIG. 3 is a perspective view of the device holder with the rotatable engaging member in the disengagement position.

FIG. 3 is a perspective view of device holder 10 holding display device 12 with rotatable engaging member 22A in the disengagement position. As illustrated in FIG. 3, device holder 10 includes engaging members 22A-22D disposed around a periphery of back plate 28. Back plate 28 further includes a plurality of mounting apertures 38. Mounting flange 40, having a plurality of back plate mounting apertures 42 and a plurality of mounting structure apertures 44, is connected to rear face 34 of back plate 28. Mounting apertures 38 of back plate 28 are arranged in a pattern and sized to receive fasteners for connecting mounting flange 40 to rear face 34. That is, mounting flange 40 connects to back plate 28 via a plurality of fasteners inserted through back plate mounting apertures 42 of mounting flange 40 and mounting apertures 38 of back plate 28, as is further described below. Mounting flange 40 can further connect to a mounting structure, such as a mounting arm (not illustrated) via mounting structure apertures 44. Mounting structure apertures 44 are disposed in rotatable portion 45 of mounting flange 40. Rotatable portion 45 is configured to rotate within mounting flange 40 around a central axis of mounting flange 40, as is further described below. Accordingly, mounting flange 40, including rotatable portion 45, can enable rotation of device holder 10 about the central axis of mounting flange 40, thereby enabling rotation of display device 12 (e.g., between a landscape orientation and a portrait orientation).

Tensioned guide bearings 46A and 46B are connected to back plate 28 (e.g., via one or more fasteners, such as screws, bolts, rivets, or other fasteners) at a position adjacent rotatable engaging member 22A. Tensioned guide bearings 46A and 46B are connected to guide bar 48 that extends between tensioned guide bearings 46A and 46B. Guide bar 48 is further connected to rotatable engaging member 22A via engagement interface 50, which can be a hooked interface (as illustrated), a looped interface that surrounds guide bar 48, or other interface that connects rotatable engaging member 22A to guide bar 48 and allows rotation of rotatable engaging member 22A about guide bar 48.

Tensioned guide bearings 46A and 46B each include a tensioning element (not illustrated) within the respective guide bearing, such as a spring or other elastic material (e.g., an elastic strap formed from rubber or other elastic material). The tensioning elements are attached to guide bar 48, which is configured to move within tensioned guide bearings 46A and 46B between first position 52 and second position 54. First position 52 corresponds to the engagement position of rotatable engaging member 22A. Second position 54 corresponds to the disengagement position of rotatable engaging member 22A. That is, rotatable engaging member 22A is configured to be positioned in the engagement position when guide bar 48 (and hence rotatable engaging member 22A via engagement interface 50) is in first position 52. Rotatable engaging member 22A is configured to be positioned in the disengagement position when guide bar 48 is in second position 54.

The tensioning elements are configured to pull guide bar 48 (and hence rotatable engaging member 22A via engagement interface 50) in a direction from second position 54 to first position 52. The tensioning elements are further configured to resist movement of guide bar 48 (and hence rotatable engaging member 22A via engagement interface 50) in a direction from first position 52 to second position 54.

In operation, tensioning elements of tensioned guide bearings 46A and 46B pull guide bar 48 and rotatable engaging member 22A in a direction toward first position 52 to secure rotatable engaging member 22A in the engagement position. In response to application of force that overcomes a tension strength of the tensioning elements, guide bar 48 and rotatable engaging member 22A can move from first position 52 to second position 54. Distance 56 between first position 52 and second position 54 can be greater than width 58 of retaining portion 24A of rotatable engaging member 22A. That is, rotatable engaging member 22A can be rotatable between the engagement position and the disengagement position when rotatable engaging member 22A is moved in a direction from first position 52 to second position 54 by a distance that is large enough to allow retaining portion 24A to clear an edge of display device 12 and thereby allow rotation of rotatable engaging member 22A between the engagement position and the disengagement position. Accordingly, distance 56 between first position 52 and second position 54 can be greater than width 58 of retaining portion 24A, thereby allowing rotatable engaging member 22A to be rotated between the engagement position and the disengagement position when guide bar 48 (and hence rotatable engaging member 22A) is in second position 54. In some examples, rotatable engaging member 22A may not include retaining portion 24A, thereby enabling rotatable engaging member 22A to rotate between the engagement position and the disengagement position without movement of rotatable engaging member 22 between the first and second position. Accordingly, in such examples, device holder 10 may not include tensioned guide bearings 46A and 46B.

The tensioning elements of tensioned guide bearings 46A and 46B exert force on rotatable engaging member 22A to pull rotatable engaging member 22A in a direction from second position 54 to first position 52. Accordingly, when rotatable engaging member 22A is rotated from the disengagement position to the engagement position, tensioned guide bearings 46A and 46B move rotatable engaging member 22A from second position 54 to first position 52 to cause retaining portion 24A to secure display device 12 within device holder 10 by overlapping a display side of display device 12.

In some examples, such as the example of FIG. 3, one or more of tensioned guide bearings 46A and 46B can include lug 60. That is, while FIG. 3 is illustrated as including lug 60 extending from tensioned guide bearing 46A, tensioned guide bearing 46B can further include a similar lug. As illustrated, lug 60 extends into a path of rotatable engaging member 22A from second position 54 to first position 52. Rotatable engaging member 22A can further include one or more tabs, such as tab 62, which is configured to abut lug 60 as rotatable engaging member 22A moves from second position 54 to first position 52. That is, rotatable engaging member 22A can further include a second tab, similar to tab 62, disposed adjacent a second lug that extends from tensioned guide bearing 46B. Tabs 62 abut lugs 60 as tensioned guide bearings 46A and 46B exert force on guide bar 48 to prevent movement of guide bar 48 from second position 54 to first position 52 when rotatable engaging member 22A is in the disengagement position. In this way, lugs 60 and tabs 62 can effectively secure rotatable engaging member 22A in the disengagement position, thereby enabling removal and/or insertion of display device 12 without requiring that rotatable engaging member 22A be held (e.g., by a user) in the disengagement position during removal and/or insertion.

Tabs 62 and/or lugs 60 can be configured to allow rotatable engaging member 22A to move from second position 54 to first position 52 when rotatable engaging member 22A is in the engagement position. For instance, as illustrated in FIG. 3, lugs 60 and/or tabs 62 can be positioned such that tabs 62 engage lugs 60 when rotatable engaging member 22A is rotated to the disengagement position, but do not engage lugs 60 when rotatable engaging member 22A is rotated to the engagement position. Accordingly, lugs 60 and tabs 62 can be configured to secure rotatable engaging member 22A at second position 54 in the disengagement position, and to allow tensioned guide bearings 46A and 46B to draw rotatable engaging member 22A to first position 52 when rotatable engaging member 22A is in the engagement position.

Figure 4:
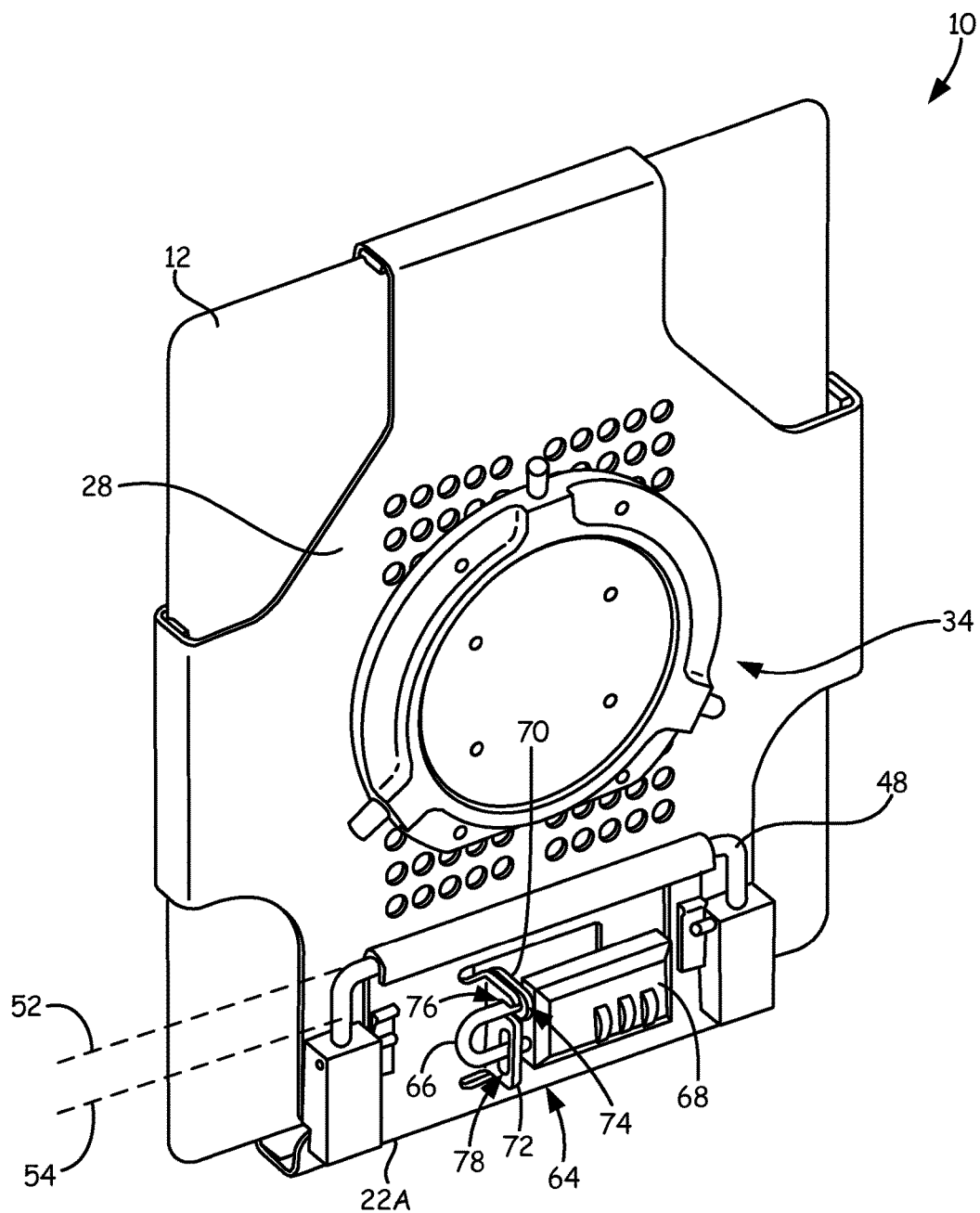
FIG. 4 is a perspective view of the device holder including a locking mechanism that can prevent rotation of the rotatable engaging member between an engagement position and the disengagement position.

FIG. 4 is a perspective view of device holder 10 including locking mechanism 64. Locking mechanism 64 can prevent rotation of rotatable engaging member 22A between the engagement position and the disengagement position when locking bar 66 of lock 68 is secured within locking mechanism 64. As illustrated, locking mechanism 64 can include first locking flange 70 and second locking flange 72. First locking flange 70 can extend from (or be connected to) back plate 28. Second locking flange 72 can extend from (or be connected to) rotatable engaging member 22A. First locking flange 70 can include aperture 74 configured to receive locking bar 66. Second locking flange 72 can include first aperture 76, which is also configured to receive locking bar 66. In some examples, such as the example of FIG. 4, second locking flange 72 can include second aperture 78 configured to receive locking bar 66.

Aperture 74 of first locking flange 70 is configured to align with first aperture 76 of second locking flange 72 when rotatable engaging member 22A is in the engagement position. Accordingly, locking bar 66 of lock 68 can be inserted through both aperture 74 and first aperture 76 simultaneously to prevent rotation of rotatable engaging member 22A between the engagement position and the disengagement position. For example, FIG. 4 is illustrated with rotatable engaging member 22A and guide bar 48 at first position 52 corresponding to the engagement position that secures display device 12 within device holder 10. Because first locking flange 70 extends from back plate 28 and second locking flange 72 extends from rotatable engaging member 22A, when locking arm 66 is inserted through both aperture 74 and first aperture 76, movement of rotatable engaging member 22A from first position 52 (corresponding to the engagement position) to second position 54 (corresponding to the disengagement position) is prevented. In this way, insertion of locking arm 66 through both aperture 74 of first locking flange 70 and first aperture 76 of second locking flange 72 can prevent rotation of rotatable engaging member 22A between the engagement and disengagement positions, thereby preventing removal of display device 12 (when display device 12 is inserted within device holder 10) and insertion of display device 12 (when display device 12 is removed from device holder 10).

As illustrated, lock 68 can be a removable lock, such as a tumbler lock (often referred to as a "luggage lock") that requires a correct passcode entry (via the tumblers) for removal of locking bar 66 to disengage the lock. In other examples, lock 68 can be integral to device holder 10, or can be a different type of removable lock. In general, lock 68 can be any type of lock that includes a locking bar (e.g., locking bar 66) configured to pass through both aperture 74 and first aperture 76 to prevent rotation of rotatable engaging member 22A. As illustrated in FIG. 4, second locking flange 72 can further include second aperture 78, which can accept locking bar 66, such as to secure lock 68 in a stowed orientation at rear face 34 of back plate 28.

Figure 5:
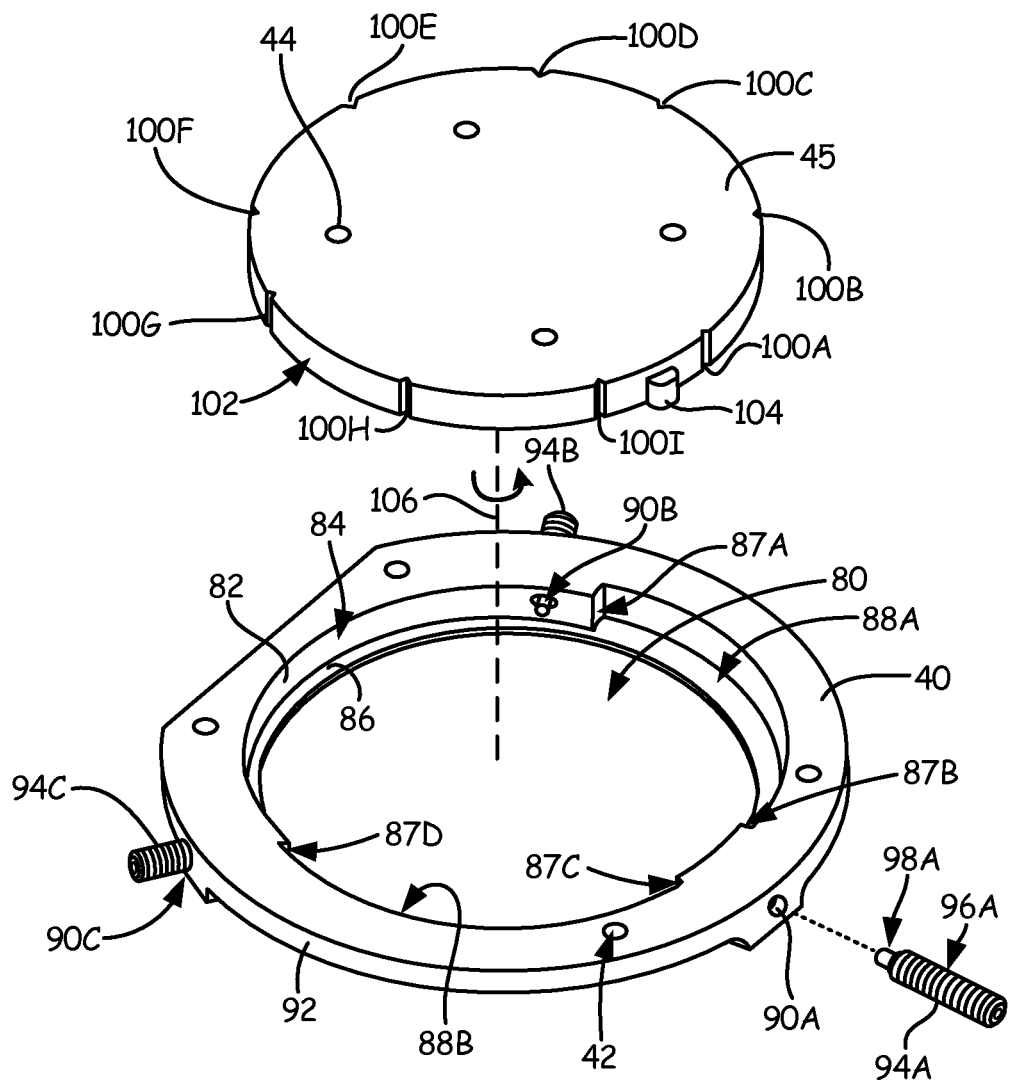
FIG. 5 is an exploded view of a mounting flange having a rotatable portion.

FIG. 5 is an exploded view of mounting flange 40 including rotatable portion 45. As illustrated, mounting flange 40 can include recessed portion 80 defined by inner face 82 of raceway 84. Raceway 84 includes lip 86 that extends circumferentially around raceway 84 to engage rotatable portion 45 and secure rotatable portion 45 within recessed portion 80. Inner face 82, in this example, further includes stop ledges 87A-87D circumferentially disposed around inner face 82 to define rotation regions 88A and 88B of raceway 84. As further illustrated, mounting flange 40 includes detent apertures 90A-90C that extend through mounting flange 40 from outer face 92 to inner face 82. Detent apertures 90A-90C are sized to receive detents 94A-94C. In some examples, such as the example of FIG. 5, detent apertures 90A-90C are threaded to engage threads of detents 94A-94C to secure detents 94A-94C within detent apertures 90A-90C. As illustrated, detent 94A includes threaded post portion 96A and moveable portion 98A, which can be a spring-loaded portion having a rounded end. Each of detents 94B and 94C can have a similar post portion and moveable portion. The moveable portions (e.g., moveable portion 98A) are configured to move axially within the post portion (e.g., post portion 96A), such as when pressure is applied that exceeds a tension strength of a tensioning element (e.g., a spring, not illustrated) within the post portion. Mounting flange 40 further includes mounting apertures 42 that can be used to secure mounting flange 40 to display device 10, as is further described below.

As illustrated in FIG. 5, rotatable portion 45 includes rotation-arresting grooves 100A-100I circumferentially arranged about peripheral face 102. In addition, rotatable portion 45 includes stop tab 104 extending from peripheral face 102 and mounting structure apertures 44 that can be used to secure rotatable portion 45 to a mounting structure, such as a mounting arm. Rotatable portion 45 is sized to fit within recessed portion 80 of mounting flange 40, such that peripheral face 102 is adjacent inner face 82 and rotatable portion 45 rests on lip 86 of raceway 84. Rotatable portion 45 is configured to be rotatable within raceway 45 around central axis 106.

Rotatable portion 45 can be positioned within mounting flange 40 such that stop tab 104 rests within one of rotation regions 88A and 88B and moveable portion 98A (and the moveable portion of each of detents 94A-94C) fits within one of rotation-arresting grooves 100A-100I. In operation, rotatable portion 45 is rotatable within raceway 84 by exerting rotational force on one of mounting flange 40 or rotatable portion 45 around central axis 106. Upon exertion of force sufficient to break the tension strength of moveable portions of detents 94A-94C (e.g., moveable portion 98A and each of the moveable portions corresponding to detents 94A-94C), the moveable portions move axially within detents 94A-94C to allow rotation of rotatable portion 45 within raceway 84. When rotatable portion 45 is rotated such that each of the moveable portions of detents 94A-94C align with another of rotation-arresting grooves 100A-100I, the tensioning elements in detents 94A-94C push the moveable portions into an aligning one of rotation-arresting grooves 100A-100I, thereby providing stable positioning of rotatable portion 45 at a position corresponding to the set of rotation-arresting grooves 100A-100I.

In the example of FIG. 5, rotatable portion 45 includes eight rotation-arresting grooves 100A-100I disposed at intervals of forty-five degrees about peripheral face 102, thereby enabling stable positioning of rotatable portion 45 at forty-five degree increments. In other examples, rotatable portion 45 can have more or fewer than eight rotation-arresting grooves 100A-100I arranged at regular or irregular intervals around peripheral face 102.

Stop tab 104 can be configured to abut one of stop ledges 87A-87D to limit rotation of rotatable portion 45 within rotation regions 88A and 88B of raceway 84. For instance, as illustrated in FIG. 5, stop tab 104 and rotation regions 88A and 88B can limit rotation of rotatable portions 45 between angles corresponding to a landscape orientation of display device 12 (i.e., an orientation in which a longest dimension of display device 12 is oriented horizontally) and a portrait orientation of display device 12 (i.e., an orientation in which a longest dimension of display device 12 is oriented vertically). In other examples, raceway 84 may not include stop ledges 87A-87D, and rotatable portion 45 may not include stop tab 104. In such examples, rotatable portion 45 can be rotatable throughout an entire circumference of raceway 84.

Figure 6:
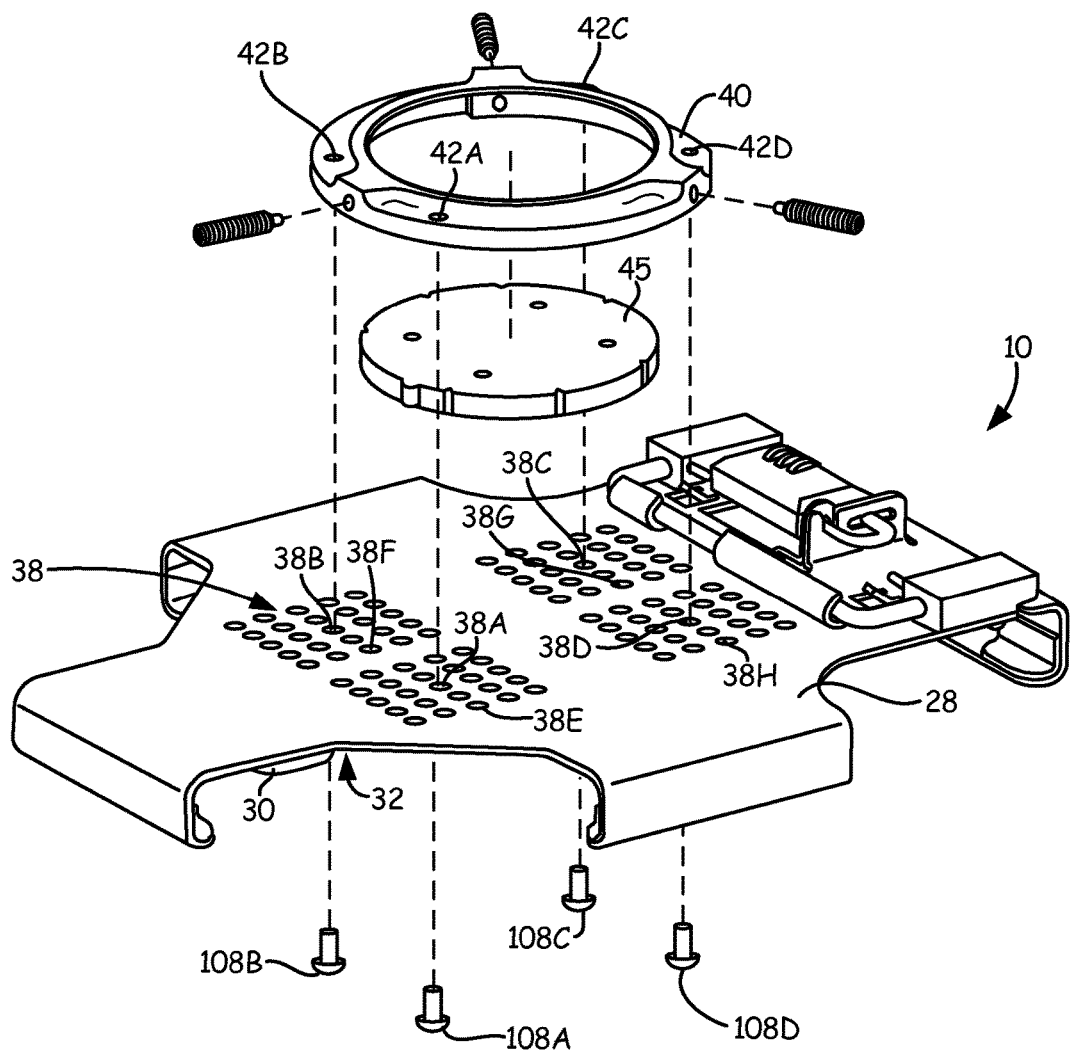
FIG. 6 is an exploded view of the mounting flange that can be connected to a back plate of the device holder via a plurality of fasteners.

FIG. 6 is an exploded view of mounting flange 40 that can be connected to back plate 28 of device holder 10 via a plurality of fasteners 108A-108D. As illustrated in FIG. 6, back plate 28 can include a plurality of mounting apertures 38. Mounting apertures 38 can be arranged in a pattern, such as a grid pattern, a pattern including a plurality of sub-grids (as illustrated in FIG. 6), or other such pattern that can enable a plurality of mounting locations between mounting flange 40 and back plate 28. As further illustrated, mounting flange 40 can include back plate mounting apertures 42A-42D (collectively referred to herein as "back plate mounting apertures 42") arranged about mounting flange 40 in a pattern that is complementary to the pattern of mounting apertures 38. That is, the pattern of mounting apertures 38 and the pattern of back plate mounting apertures 42A-42D can be complementary, such as to allow simultaneous insertion of each of fasteners 10A-108D through back plate 28 via mounting apertures 38 and mounting flange 40 via back plate mounting apertures 42A-42D. For instance, back plate 28 can include mounting apertures 38A-38D arranged to align with back plate mounting apertures 42A-42D, respectively.

In operation, mounting flange 40 can be secured to back plate 28 via fasteners 108A-108D that extend through mounting apertures 38A-38D and back plate mounting apertures 42A-42D. In some examples, such as the example of FIG. 6, fasteners 108A-108D can be inserted such that a fastener head extends from front side 32 of back plate 28. In such examples, a thickness of filler elements 30 can be configured to extend from front face 32 beyond the fastener heads to prevent contact between the display device and the fastener heads. In other examples, fasteners 108A-108D can be inserted such that the fastener heads extend from mounting flange 40.

As illustrated in FIG. 6, a number of apertures in the plurality of mounting apertures 38 can be greater than a number of back plate mounting apertures 42 in mounting flange 40. In addition, the pattern of mounting apertures 38 can enable mounting flange 40 to be connected to back plate 28 at a plurality of locations of back plate 28. For example, as illustrated, mounting apertures 38 can further include mounting apertures 38E-38H. Mounting apertures 38E-38H can be configured to align with the set of back plate mounting apertures 42, thereby enabling mounting flange 40 to be connected to back plate 28 at a plurality of locations. The pattern and number of mounting apertures 38 in back plate 28 can enable multiple such connections, thereby increasing adaptability of device holder 10 to be mounted to a mounting structure, such as a mounting arm in a cockpit of an aircraft.

Accordingly, as described herein, device holder 10 can securely and adaptably mount a device, such as display device 12, to a mounting structure (e.g., a mounting arm in a vehicle, such as an aircraft). Engaging members 22A-22D secure the device within device holder 10 to prevent removal or insertion of the device when engaging members 22A-22D are in an engagement position. At least one of engaging members 22A-22D, such as engaging member 22A, is configured to rotate between an engagement position and a disengagement position to enable the device to be inserted and removed from device holder 10. Locking mechanism 64 can prevent rotation of the rotatable engaging member, thereby preventing removal and/or insertion of the device. Mounting flange 40, including rotatable portion 45, is configured to rotate about central axis 106, thereby enabling rotation of the device (e.g., between landscape and portrait orientations). Mounting flange 40 can be connected to back plate 28 of device holder 10 at a plurality of locations, thereby enabling adaptable mounting of the device, such as for cross-platform use of device holder 10.

The following are non-exclusive descriptions of possible embodiments of the present invention.

As one example, an apparatus for holding a display device according to this disclosure includes a back plate including a rear face and a front face opposite the rear face. The apparatus further includes a plurality of engaging members disposed around a periphery of the back plate and extending from the back plate in a direction from the rear face to the front face to define an outer boundary of a retention space configured to accept the display device. The plurality of engaging members include a rotatable engaging member configured to rotate between an engagement position configured to secure the display device within the retention space and a disengagement position configured to allow removal of the display device from the retention space.

The apparatus of the preceding paragraph can optionally include, additionally and/or alternatively, any one or more of the following features, configurations, and/or additional components:

The apparatus can further include one or more tensioned guide bearings secured to the rear face of the back plate adjacent the rotatable engaging member. The rotatable engaging member can be connected to each of the one or more tensioned guide bearings. Each of the one or more tensioned guide bearings can include a tensioning element configured to pull the rotatable engaging member in a direction toward the engagement position.

Each of the one or more tensioned guide bearings can be configured to allow movement of the rotatable engaging member along an axis of the back plate between a first position corresponding to the engagement position and a second position corresponding to the disengagement position. The tensioning element can be configured to pull the rotatable engaging member in the direction toward the engagement position by being configured to pull the rotatable engaging member toward the first position and to resist movement of the rotatable engaging member in a direction toward the second position. The rotatable engaging member can be rotatable between the engagement position and the disengagement position that allows removal of the display device when the rotatable engaging member is in the second position.

The rotatable engaging member can include a retaining portion configured to extend a first distance from the outer boundary of the retaining space in a direction toward an interior of the retaining space to retain the display device within the retaining space. The rotatable engaging member can be rotatable between the engagement position and the disengagement position when the rotatable engaging member is moved a second distance from the first position to the second position, the second distance greater than the first distance.

At least one of the one or more tensioned guide bearings can include a lug extending from the tensioned guide bearing into a path of the rotatable engaging member between the first position and the second position. The rotatable engaging member can include at least one tab configured to engage the lug to prevent rotation of the rotatable engaging member when the rotatable engaging member is in the disengagement position and maintain the rotatable engaging member in the disengagement position.

The plurality of engaging members can include a first engaging member disposed at a first end of the retention space, a second engaging member disposed at a second end of the retention space opposite the first end, a third engaging member disposed at a first side of the retention space, and a fourth engaging member disposed at a second side of the retention space opposite the first side. Both the first end and the second end can be orthogonal to both the first side and the second side.

The apparatus can further include a locking mechanism configured to prevent rotation of the rotatable engaging member between the engagement position and the disengagement position.

The locking mechanism can include a first locking portion and a second locking portion. The first locking portion can include a first aperture. The second locking portion can include a second aperture. Each of the first and second locking apertures can be configured to receive a locking bar of a removable lock. The first and second locking portions can be positioned to prevent rotation of the rotatable engaging member between the engagement position and the disengagement position when the locking bar of the removable lock is inserted through each of the first and second locking apertures.

The apparatus can further include one or more tensioned guide bearings secured to the rear face of the back plate adjacent the rotatable engaging member and connected to the rotatable engaging member to allow movement of the rotatable engaging member along an axis of the back plate between a first position corresponding to the engagement position and a second position corresponding to the disengagement position. The first and second locking portions can be positioned to prevent rotation of the rotatable engaging member between the engagement position and the disengagement position when the locking bar of the removable lock is inserted through each of the first and second locking apertures by preventing movement of the rotatable engaging member between the first and second positions.

The back plate can further include a first plurality of apertures. Each of the first plurality of apertures can be sized to receive one of a plurality of fasteners for connecting the back plate to a mounting flange.

The apparatus can further include the mounting flange. The mounting flange can include a second plurality of apertures, each of the second plurality of apertures sized to receive one of the plurality of fasteners. The first plurality of apertures can be arranged in a first pattern. The second plurality of apertures can be arranged in a second pattern. The first and second patterns can be complementary to allow insertion of the plurality of fasteners through both the first and second pluralities of apertures. The mounting flange can be connected to the rear face of the back plate via insertion of the plurality of fasteners through the first plurality of apertures and the second plurality of apertures.

A number of apertures of the first plurality of apertures in the back plate can be greater than a number of apertures of the second plurality of apertures in the mounting flange. The first pattern of apertures in the back plate can be arranged to allow connection of the mounting flange via both a first set of the first plurality of apertures and a second, different set of the first plurality of apertures.

At least one of the apertures from the first set of apertures can be included in the second set of apertures.

The mounting flange can include a rotatable portion configured to connect to a mounting structure. The rotatable portion can be rotatable around a central axis of the mounting flange to allow rotation of the back plate around the central axis.

As another example, an apparatus for holding a display device according to this disclosure can include a back plate including a rear face and a front face opposite the rear face. The apparatus can further include a plurality of engaging members disposed around a periphery of the back plate and extending from the back plate in a direction from the rear face to the front face to define an outer boundary of a retention space configured to accept the display device. The apparatus can further include a mounting flange connected to the rear face of the back plate via a plurality of fasteners, the back plate including a first plurality of apertures arranged in a first pattern, the mounting flange including a second plurality of apertures arranged in a second pattern. The second pattern can be complementary to the first pattern to allow insertion of the plurality of fasteners through the first plurality of apertures into the second plurality of apertures. The first pattern of apertures in the back plate can be arranged to allow connection of the mounting flange via both a first set of the first plurality of apertures and a second, different set of the first plurality of apertures.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An apparatus for holding a display device, the apparatus comprising:
   a plate comprising a rear face and a front face opposite the rear face;
   a plurality of engaging members disposed around a periphery of the plate and extending from the plate in a direction from the rear face to the front face to define an outer boundary of a retention space configured to accept the display device, the plurality of engaging members including a rotatable engaging member configured to rotate between an engagement position configured to secure the display device within the retention space and a disengagement position configured to allow removal of the display device from the retention space;

one or more tensioned guide bearings secured to the rear face of the plate adjacent the rotatable engaging member;

wherein the rotatable engaging member is connected to each of the one or more tensioned guide bearings;

wherein the each of the one or more tensioned guide bearings includes a tensioning element configured to pull the rotatable engaging member in a direction toward the engagement position;

wherein the each of the one or more tensioned guide bearings are configured to allow movement of the rotatable engaging member along an axis of the plate between a first position corresponding to the engagement position and a second position corresponding to the disengagement position;

wherein the tensioning element is configured to pull the rotatable engaging member in the direction toward the engagement position by being configured to pull the rotatable engaging member toward the first position and to resist movement of the rotatable engaging member in a direction toward the second position;

wherein the rotatable engaging member is rotatable between the engagement position and the disengagement position that allows removal of the display device when the rotatable engaging member is in the second position wherein at least one of the one or more tensioned guide bearings includes a lug extending from the tensioned guide bearing into a path of the rotatable engaging member between the first position and the second position; and wherein the rotatable engaging member includes at least one tab configured to engage the lug to prevent rotation of the rotatable engaging member when the rotatable engaging member is in the disengagement position and maintain the rotatable engaging member in the disengagement position.

2. The apparatus of claim 1, wherein the rotatable engaging member includes a retaining portion configured to extend a first distance from the outer boundary of the retaining space in a direction toward an interior of the retaining space to retain the display device within the retaining space; and wherein the rotatable engaging member is rotatable between the engagement position and the disengagement position when the rotatable engaging member is moved a second distance from the first position to the second position, the second distance greater than the first distance.

3. The apparatus of claim 1, wherein the plurality of engaging members comprises:

a first engaging member disposed at a first end of the retention space;

a second engaging member disposed at a second end of the retention space opposite the first end;

a third engaging member disposed at a first side of the retention space; and a fourth engaging member disposed at a second side of the retention space opposite the first side;

wherein both the first end and the second end are orthogonal to both the first side and the second side.

4. The apparatus of claim 1, further comprising:

a locking mechanism configured to prevent rotation of the rotatable engaging member between the engagement position and the disengagement position.

5. The apparatus of claim 4, wherein the locking mechanism includes a first locking portion and a second locking portion, the first locking portion including a first aperture, the second locking portion including a second aperture;

wherein each of the first and second locking apertures are configured to receive a locking bar of a removable lock; and wherein the first and second locking portions are positioned to prevent rotation of the rotatable engaging member between the engagement position and the disengagement position when the locking bar of the removable lock is inserted through each of the first and second locking apertures.

6. The apparatus of claim 5, wherein the first and second locking portions are positioned to prevent rotation of the rotatable engaging member between the engagement position and the disengagement position when the locking bar of the removable lock is inserted through each of the first and second locking apertures by preventing movement of the rotatable engaging member between the first and second positions.

7. The apparatus of claim 1, wherein the plate further comprises a first plurality of apertures, each of the first plurality of apertures sized to receive one of a plurality of fasteners for connecting the plate to a mounting flange.

8. The apparatus of claim 7, further comprising:

the mounting flange;

wherein the mounting flange comprises a second plurality of apertures, each of the second plurality of apertures sized to receive one of the plurality of fasteners;

wherein the first plurality of apertures is arranged in a first pattern and the second plurality of apertures is arranged in a second pattern, the first and second patterns complementary to allow insertion of the plurality of fasteners through both the first and second pluralities of apertures; and wherein the mounting flange is connected to the rear face of the plate via insertion of the plurality of fasteners through the first plurality of apertures and the second plurality of apertures.

9. The apparatus of claim 8, wherein a number of apertures of the first plurality of apertures in the plate is greater than a number of apertures of the second plurality of apertures in the mounting flange; and wherein the first pattern of apertures in the plate is arranged to allow connection of the mounting flange via both a first set of the first plurality of apertures and a second, different set of the first plurality of apertures.

10. The apparatus of claim 9, wherein at least one of the apertures from the first set of apertures is included in the second set of apertures.

11. The apparatus of claim 8, wherein the mounting flange comprises a rotatable portion configured to connect to a mounting structure; and wherein the rotatable portion is rotatable around a central axis of the mounting flange to allow rotation of the plate around the central axis.

12. An apparatus for holding a display device, the apparatus comprising:

a plate comprising a rear face and a front face opposite the rear face;

a plurality of engaging members disposed around a periphery of the plate and extending from the plate in a direction from the rear face to the front face to define an outer boundary of a retention space configured to accept the display device, the plurality of engaging members including a rotatable engaging member configured to rotate between an engagement position configured to secure the display device within the retention space and a disengagement position configured to allow removal of the display device from the retention space; and a locking mechanism configured to prevent rotation of the rotatable engaging member between the engagement position and the disengagement position;

wherein the locking mechanism includes a first locking portion and a second locking portion, the first locking portion including a first aperture, the second locking portion including a second aperture;

wherein each of the first and second locking apertures are configured to receive a locking bar of a removable lock;

wherein the first and second locking portions are positioned to prevent rotation of the rotatable engaging member between the engagement position and the disengagement position when the locking bar of the removable lock is inserted through each of the first and second locking apertures.

13. The apparatus of claim 12, further comprising:

one or more tensioned guide bearings secured to the rear face of the plate adjacent the rotatable engaging member;

wherein the rotatable engaging member is connected to each of the one or more tensioned guide bearings; and wherein the each of the one or more tensioned guide bearings includes a tensioning element configured to pull the rotatable engaging member in a direction toward the engagement position.

14. The apparatus of claim 13, wherein the each of the one or more tensioned guide bearings are configured to allow movement of the rotatable engaging member along an axis of the plate between a first position corresponding to the engagement position and a second position corresponding to the disengagement position;

wherein the tensioning element is configured to pull the rotatable engaging member in the direction toward the engagement position by being configured to pull the rotatable engaging member toward the first position and to resist movement of the rotatable engaging member in a direction toward the second position; and wherein the rotatable engaging member is rotatable between the engagement position and the disengagement position that allows removal of the display device when the rotatable engaging member is in the second position.

15. The apparatus of claim 14, wherein the rotatable engaging member includes a retaining portion configured to extend a first distance from the outer boundary of the retaining space in a direction toward an interior of the retaining space to retain the display device within the retaining space; and wherein the rotatable engaging member is rotatable between the engagement position and the disengagement position when the rotatable engaging member is moved a second distance from the first position to the second position, the second distance greater than the first distance.

16. The apparatus of claim 12, wherein the plurality of engaging members comprises:

a first engaging member disposed at a first end of the retention space;

a second engaging member disposed at a second end of the retention space opposite the first end;

a third engaging member disposed at a first side of the retention space; and a fourth engaging member disposed at a second side of the retention space opposite the first side;

wherein both the first end and the second end are orthogonal to both the first side and the second side.

17. The apparatus of claim 12, wherein the first and second locking portions are positioned to prevent rotation of the rotatable engaging member between the engagement position and the disengagement position when the locking bar of the removable lock is inserted through each of the first and second locking apertures by preventing movement of the rotatable engaging member between the first and second positions.

* * * * *